Oct. 27, 1925.
C. J. LAUNDRIE
1,558,989
TIRE RIM ADJUSTING DEVICE
Filed Sept. 25, 1924
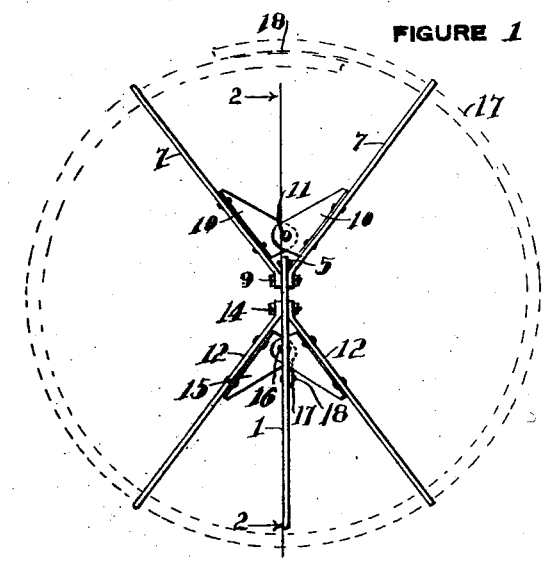
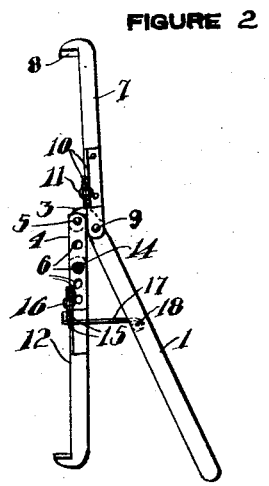
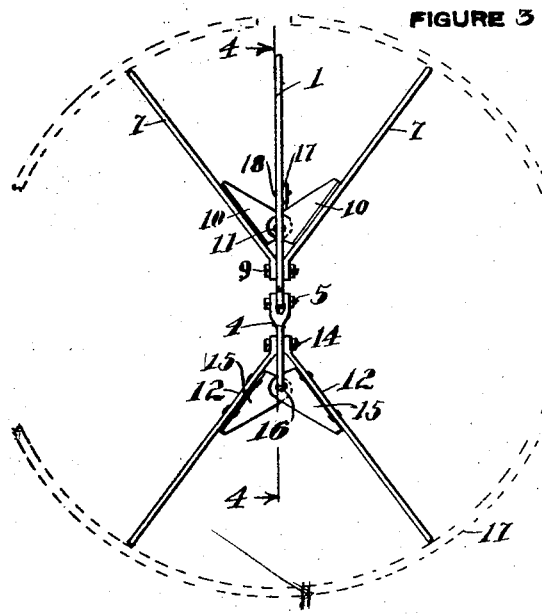
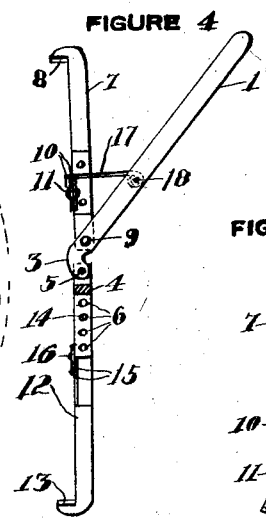
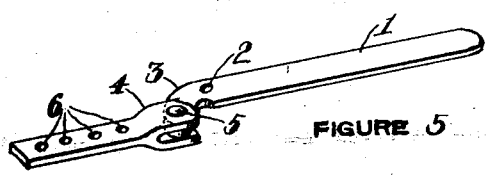
INVENTOR
Charles J. Laundrie
BY John A. Naismith
ATTORNEY Patented Oct. 27, 1925.

1,558,989

UNITED STATES PATENT OFFICE.

CHARLES J. LAUNDRIE, OF SAN JOSE, CALIFORNIA.

TIRE-RIM-ADJUSTING DEVICE.

Application filed September 25, 1924. Serial No. 739,805.

*To all whom it may concern:*

Be it known that I, CHARLES J. LAUNDRIE, a citizen of the United States, and a resident of San Jose, in the county of Santa Clara and State of California, have invented certain new and useful Improvements in Tire-Rim-Adjusting Devices, of which the following is a specification.

It is one object of my invention to provide a simple mechanism for contracting or expanding a tire rim as may be desired for the removal or replacement of a tire thereon.

It is another object of my invention to provide a device of the character indicated that may be quickly adjusted for rims of different diameters.

It is still another object of my invention to provide a device for the purpose stated that will be simple in construction and operation, economical to manufacture, and highly efficient in its practical application.

In the drawing:—

Figure 1 is a plan view of the device in an operative position contracting a tire rim.

Figure 2 is a sectional view of the device on line 2—2 of Figure 1.

Figure 3 is a plan view of the device expanding a tire rim.

Figure 4 is a sectional view on 4—4 Figure 3.

Figure 5 is a perspective view of the operating lever.

Figure 6 is a detail illustration of a portion of the device collapsed for carrying.

Referring more particularly to the drawing, I show at 1 a lever fulcrumed at 2 and having its shorter arm curved as at 3 and pivotally connected to a link 4 by a pin 5. The link 4 is provided with several holes as 6—6—6—6.

At 7—7 are a pair of bars provided at their outer extremities with hooks 8—8. These bars are connected to the opposite sides of lever 1 at the fulcrum point 2 by a bolt 9, and are angularly arranged with relation thereto as shown.

At 10—10 are a pair of ears, one mounted on each bar 7 and overlapping each other as shown and pivotally secured together by rivet 11. These ears so connected form a substantial brace for the two bars and yet permit their being collapsed into parallel relation to each other for packing when the bolt 9 is removed and they are so disconnected from lever 1.

At 12—12 are another pair of bars similar in form and dimensions to bars 7—7 and provided at their outer ends with hooks 13—13. The inner ends of these bars 12—12 are connected to opposite sides of link 4 by a bolt 14 passing therethrough. These bars 12—12 are provided with ears 15—15 connected by a pivotal rivet 16 in exactly the same manner as ears 10—10 are provided for bars 7—7.

When the device is assembled with the bolt 14 passing through the hole 6 that will permit the bar 7—7 to be expanded over the rim to be removed, the lever 1 is thrown into the position shown in Figure 4 and the hooks 8—8 and 13—13 are placed over the edge of the rim 17. Now by throwing the lever over into the position shown in Figure 2 the spread of the four bars is so reduced as to materially contract the rim, its ends overlapping as at 18 and permitting the instant removal of the tire therefrom.

If, now, the tire has been replaced upon the rim the rim is sprung back into place in the following manner. First, the lever 1 is thrown into the position shown in Figure 2 and inserted within the circumference of the rim 17. The lever 1 is now thrown into the position shown in Figure 4 and the four bars forced outwardly against the inner side of the rim 17, expanding it as shown in Figure 3. When the lever 1 is thrown back again into the position shown in Figure 2 and the device removed, the ends of the rim drop into their normal positions in contact with each other.

When the device is not in use the bolts 9 and 14 are removed, whereupon the two sets of bars 7—7 and 12—12 are folded into parallel relation to each other and formed into a compact bundle with the lever 1 and link 4.

From the foregoing description of the construction and operation of the device it may be readily seen that I have provided a device that is not only simple in construction and operation, but also one that is positive in action and highly efficient in its practical application.

It is to be understood, of course, that while I have herein shown and described one specific embodiment of my invention, changes in form, construction and method of operation may be made within the scope of the appended claim.

I claim:—

A collapsible and portable tire rim adjuster comprising a link having a plurality of spaced orifices arranged longitudinally therein, a pair of outwardly diverging hooked arms positioned on opposite sides of said link, a bolt passing therethrough and through one of said orifices to secure said link and arms in fixed relation to each other overlapping ears mounted upon the opposed sides of said arms and a pivotal connection between said ears, a lever having an offset end portion pivotally connected to said link, a pair of outwardly diverging hooked arms removably mounted upon opposite sides of said lever adjacent to the point of attachment of said link, overlapping ears mounted upon the opposed sides of said last mentioned arms, and a pivotal connection between said overlapping ears.

CHARLES J. LAUNDRIE.